Aug. 11, 1936.                H. V. DIXON, JR                2,050,283
PROPELLER DRIVING MECHANISM
Filed May 19, 1934
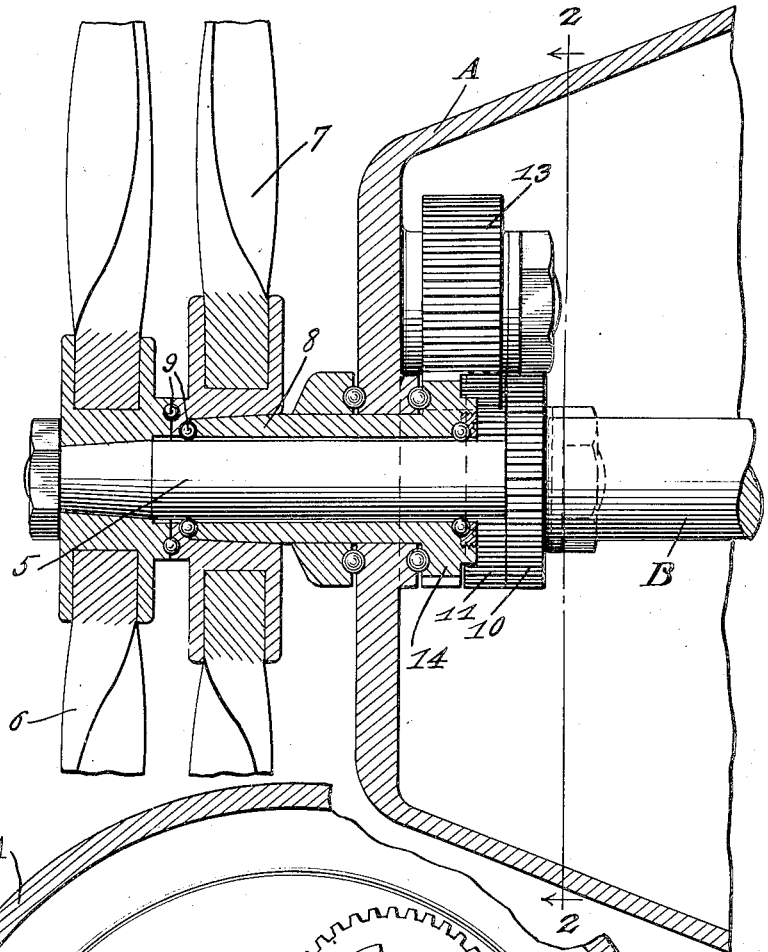
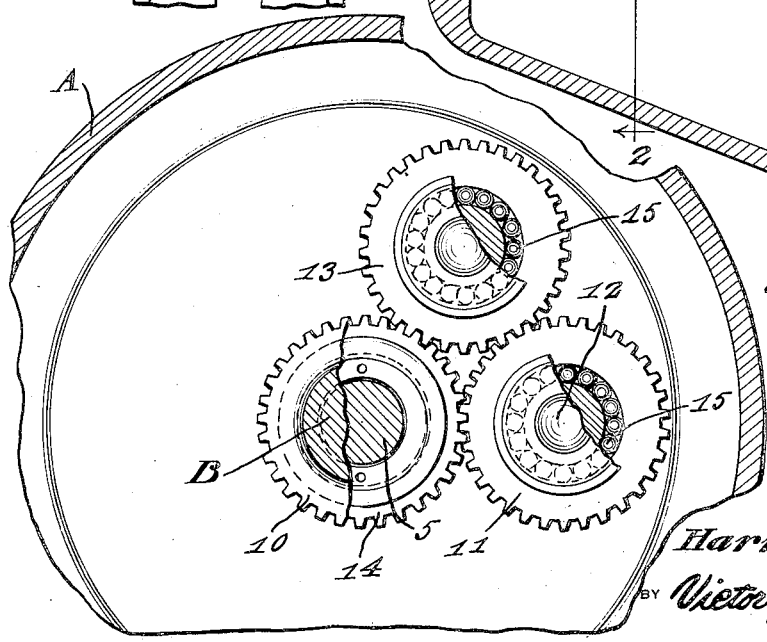
Harry V. Dixon, Jr.
INVENTOR
BY Victor J. Evans & Co.
ATTORNEY Patented Aug. 11, 1936

2,050,283

UNITED STATES PATENT OFFICE 2,050,283

PROPELLER DRIVING MECHANISM

Harry V. Dixon, Jr., Los Angeles, Calif.

Application May 19, 1934, Serial No. 726,599

1 Claim. (Cl. 170—165)

The invention relates to a propeller driving mechanism and more especially to twin propeller driving mechanism.

The primary object of the invention is the provision of mechanism of this character, wherein a pair of propellers will be driven in opposite directions at the same speed, so as to eliminate completely propeller vibration, as well as feathering, with increased performance and efficiency.

Another object of the invention is the provision of mechanism of this character, wherein the propellers when being driven for rotation in opposite directions and at the same speed will relieve any tendency to create a gyroscopic effect and at the same time eliminate vibration.

A further object of the invention is the provision of a mechanism of this character which is extremely simple in construction, thoroughly reliable and efficient in its operation, durable, obviating all difficulties heretofore experienced resultant from vibration, and feathering when an aircraft is in flight, and also inexpensive to manufacture and install.

With these and other objects in view, the invention consists in the features of construction, combination and arrangement of parts as will be hereinafter more fully described in detail, illustrated in the accompanying drawing, which discloses the preferred embodiment of the invention, and pointed out in the claim hereunto appended.

In the accompanying drawing:

Figure 1 is a vertical sectional view through the nose end of an aircraft showing the twin propellers operated from the driving mechanism constructed in accordance with the invention.

Figure 2 is a sectional view on the line 2—2 of Figure 1 looking in the direction of the arrows.

Similar reference characters indicate corresponding parts throughout the several views in the drawing.

Referring to the drawing in detail, A designates a portion of the nose end of an aircraft and B the motor power shaft which extends centrally through the said nose fore end A thereof, the extended end 5 being reduced and at its outer extremity having fixed thereto a bladed propeller 6, while rearwardly of this propeller and next thereto is a second propeller 7, it being fixed to a hub 8 journaled on the reduced end 5 of the power shaft B, it being understood, of course, that suitable bearing rollers 9 are arranged with the said hub 8 and the said propellers 6 and 7 at their meeting.

The reduced end 5 of the power shaft, at the inner end of said end, carries a driving gear 10 meshing with an idle gear 11 journaled upon a stud arbor 12 carried interiorly of the nose portion A of the craft. The gear 11 meshes with a driving gear 13 which meshes with a gear 14 formed with the hub 8. The gears 11 and 13 operate with anti-friction bearings 15 which are of conventional mounting.

When motion is imparted to the power shaft B from a motor (not shown) the propeller 6 will rotate in one direction and through the gears 10, 11, 13 and 14 reverse rotation will be imparted to the propeller 7, and by reason of the ratio of these gears both propellers operating in reverse directions will be driven at the same speed and this working of said propellers will tend to eliminate vibration and feathering and materially benefiting performance and efficiency when the aircraft is in flight.

What is claimed is:

The combination of a pair of propellers, an axle carrying one of the propellers, a sleeve rotatable on said axle and carrying the other propeller, bearings interfitted between the propellers, axle and sleeve, respectively, a driving gear fixed to the axle, an idle gear meshing with said driving gear, a gear formed on the sleeve, and a driving gear meshing with said last-named gear and the idle gear, the propellers being disposed next to each other and one in advance of the other.

HARRY V. DIXON, Jr.